United States Patent [19]

Epstein

[11] 3,727,084
[45] Apr. 10, 1973

[54] ACCELEROMETER UTILIZING SHEAR RESPONSIVE X-CUT LITHIUM NIOBATE

[75] Inventor: Howard C. Epstein, South Pasadena, Calif.

[73] Assignee: Becton, Dickinson Electronics Company, Pasadena, Calif.

[22] Filed: June 29, 1970

[21] Appl. No.: 50,657

[52] U.S. Cl. .................................. 310/9.5, 310/8.4
[51] Int. Cl. ......................... H01v 7/02, H04r 17/00
[58] Field of Search .............. 310/8.2–8.7, 9.5, 9.6; 252/62.9

[56] References Cited

UNITED STATES PATENTS

| | | | |
|---|---|---|---|
| 3,206,626 | 9/1965 | Burley | 310/8.4 |
| 3,229,128 | 1/1966 | Faulk et al. | 310/8.4 |
| 3,307,054 | 2/1967 | Shoor | 310/8.4 |
| 3,461,408 | 8/1969 | Onoe et al. | 310/9.5 X |
| 3,186,237 | 6/1965 | Forrest | 310/8.4 X |
| 3,104,334 | 9/1963 | Bradley, Jr. et al. | 310/8.4 |
| 3,591,813 | 7/1971 | Coquin | 310/9 |
| 3,528,765 | 9/1970 | Fay et al. | 252/62.9 |
| 3,525,885 | 8/1970 | Ballman | 310/9.5 |

OTHER PUBLICATIONS

Hardware report dated January 1970
Journal of the American Acoustical Society of America, paper by Warner, Onoe and Coquin, 1967.

Primary Examiner—J. D. Miller
Assistant Examiner—Mark O. Budd
Attorney—Reed C. Lawlor

[57] ABSTRACT

The accelerometer of this invention utilizes a a lithium niobate crystal operated in the shear mode with the shearing planes parallel to a mirror plane and with the axis of the acceleration arranged at an angle of about 32° in the second and fourth quadrants of the Y–Z planes of the crystal. This accelerometer has high efficiency and operates effectively over a wide range of temperatures including high temperatures above 1,000°F.

12 Claims, 6 Drawing Figures

PATENTED APR 10 1973
3,727,084
SHEET 1 OF 2
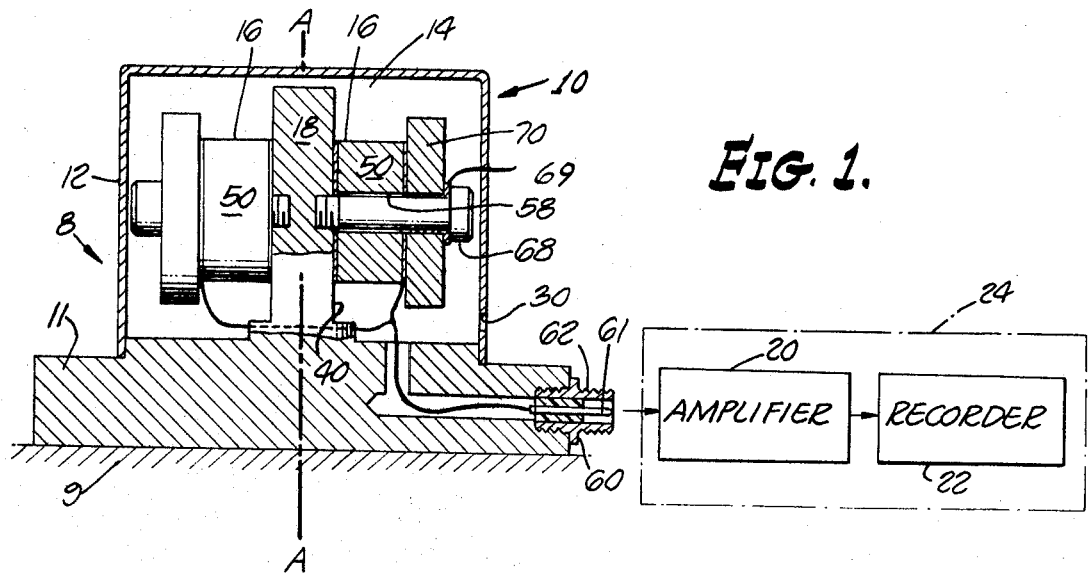
FIG. 1.
FIG. 2.
FIG. 3.
HOWARD C. EPSTEIN
INVENTOR.
ATTORNEY

HOWARD C. EPSTEIN
INVENTOR.

BY
ATTORNEY

ACCELEROMETER UTILIZING SHEAR RESPONSIVE X-CUT LITHIUM NIOBATE

This invention relates to accelerometers and more particularly to a piezoelectric accelerometer which is of high efficiency and is adapted to be operative over a wide range of temperatures, including high temperatures above 1000°F.

GENERAL DESCRIPTION OF THE INVENTION

The accelerometer of this invention makes use of an X-cut lithium niobate crystal in the shear mode, thus taking optimum advantage of the characteristics of piezoelectric lithium niobate crystal material to achieve high sensitivity to acceleration in a high temperature environment.

It is known that lithium niobate in monocrystalline form is piezoelectric and that its piezoelectric properties are preserved at high temperatures, such as at temperatures over 1400°F., as well as at a low temperature, such as temperatures of −60°F. The sensitivity of an accelerometer employing such a material depends in part on how the crystal is cut and how it is subjected to acceleration. This invention makes use of an X-cut lithium niobate crystal operated in the shear mode with the axis of maximum sensitivity at an angle of about 32° from the Z axis. This accelerometer not only has high sensitivity at high temperatures, but is also substantially free of cross-axis sensitivity. Furthermore, by taking special precautions, an accelerometer utilizing lithium niobate is provided for operating at such high temperatures over a long period of time.

DRAWINGS

Various features of this invention are described below in connection with the accompanying drawings wherein:

FIG. 1 is an elevational view, partly in cross-section, of a balanced accelerometer constructed in accordance with this invention;

FIGS. 2 and 3 are perspective views employed to explain the invention;

DETAILED DESCRIPTION

Figure 4:
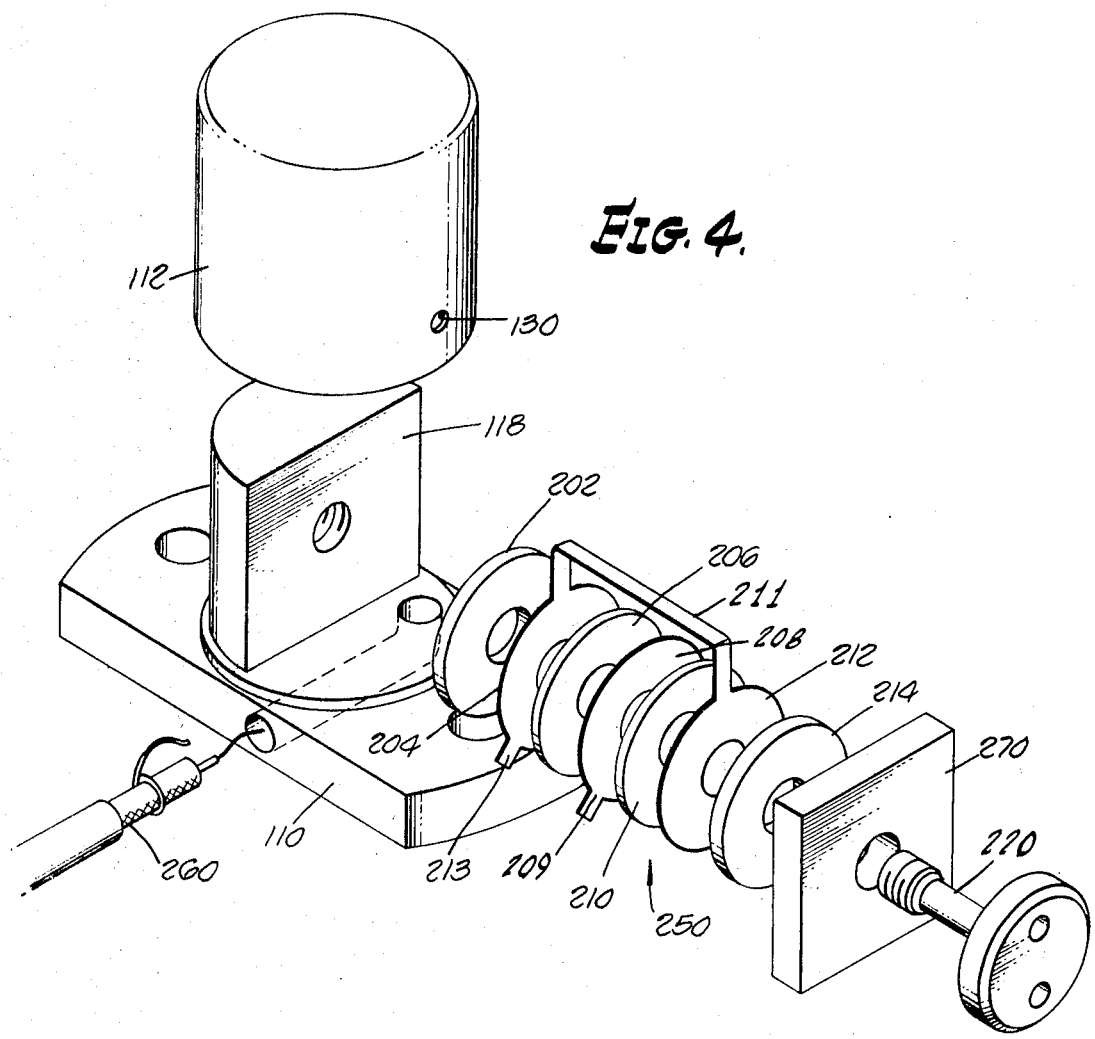
FIG. 4 is an exploded isometric view of an accelerometer showing details of an accelerometer employing this invention.

Referring to FIG. 1 there is illustrated an accelerometer 8 comprising a housing 10 formed partly by a base 11 and a case 12 providing a cylindrical hollow cavity 14 and comprising a pair of acceleration sensing devices 16 symmetrically mounted on a post 18 projecting from the base 11 into the cavity 14. The accelerometer 8 is rigidly secured by means of screws (not shown) to an object 9 undergoing test. The accelerometer is designed to have an axis A—A of maximum sensitivity parallel to the axis of the post 18 and perpendicular to the base 11. The accelerometer will be described as if mounted to detect the component of acceleration along a vertical axis.

The two acceleration sensing units 16 include two piezoelectric crystals 50 that are electrically connected together in such a manner that the electrical signals generated by them in response to such acceleration are combined to supply signals to a utilization device 24 in the form of a charge amplifier 20 and recorder 22.

The post 18 may be formed unitary with the base 11 or it may be threadably or otherwise secured thereto or it may be fixed thereon by brazing. The casing or case 12 is firmly secured to the base 11 by a method such as by brazing. The casing is provided with a small perforation 30 to provide communication between the cavity 14 and the external atmosphere, for a purpose to be described hereinafter.

The post 18 is provided with two flat parallel surfaces 40 that extend vertically, on opposite sides thereof parallel to the acceleration axis A—A. Each of the acceleration sensing units 16 comprises a piezoelectric crystal 50 and an inertial mass 70. Each crystal 50 is provided with two plane parallel faces 52a and 52b (FIG. 2). One face 52a is in metallic contact with the flat face 40 of the post 18 on one side thereof. The other face 52b is in metallic contact with one of the respective inertia members 70. The faces 52a and 52b of each of the crystals are coated with electrodes 54a and 54b. Each electrode is formed of an inner layer LI of conductive material such as evaporated or sputtered chromium and a thin outer layer LO of a noncorrosive, soft, and malleable material such as gold.

The piezoelectric elements 50 are in the form of cylindrical rings or plates, and the cylindrical side walls are free of metallic material so that the two electrodes 54a and 54b are insulated from each other, thereby forming a capacitance in which the two plates provided by the electrodes are spaced apart by the dielectric material constituting the piezoelectrical element. The faces of the crystals are cut and polished to an optical finish and the chromium and gold are thin and of uniform thickness. Furthermore, the gold is sufficiently soft and malleable to assure complete even contact of the faces of the crystals with the post 18 and inertia members 70. The inertia members are held in place by means of bolts 68, extending horizontally through them and through oversized holes 58 in the centers of the piezoelectric elements. To prevent short circuiting, insulating spacers 69 separate the bolts 68 from the inertia members and the crystals.

All of the mechanical parts including the base 11, the post 18, the case 12, and the bolts 68 are formed of Inconel. This metal is preferred for this purpose since its temperature coefficient of expansion corresponds closely to that of the lithium niobate crystal and is highly resistant to corrosion at high temperatures.

In the best embodiment of this invention known, each of the piezoelectric elements 50 is in the form of a single lithium niobate crystal cut with its parallel faces 52a and 52b in an X-plane of the crystal. Such a piezoelectric crystal is called an X-cut crystal.

Lithium niobate crystals are of the crystal class that have symmetry properties belonging to the 3m group. As illustrated in FIG. 3, the crystal has three mirror planes M that extend in directions parallel to the Z, or optical, axis. These planes intersect in pairs parallel to the optical or Z axis and they are separate by dihedral angles of 120°. The mirror planes are shown as if they originate in a common axis D—D which is parallel to the optical axis Z. In fact, of course, the planes extend indefinitely so that each plane intersects the angle between each of the other two planes, thus accounting for the 120° separation between the planes. Because of the three-fold symmetry, each mirror plane M may be considered to include the Y axis, which is perpendicular to the Z axis. Furthermore, the X axis with respect to each plane of symmetry lies in a direction perpendicular to both the Y axis and the Z axis. Stated differently, the X axis is perpendicular to the corresponding mirror plane M. As indicated in FIG. 2, the faces 52 of the crystals are perpendicular to one of the three X-axes and hence include a mirror plane M.

The maximum sensitivity occurs for a force along the positive X face applied in a direction that is a positive angle of about 32° from the positive Z axis. The positive Y and Z directions are those that produce positive voltages under application of tensile stresses along the Y and Z axes respectively. The positive X face is the one that forms a right-hand coordinate system with the positive Y and Z axes.

Lithium niobate crystal is characterized by eight piezoelectric coefficients of which four are mutually independent, as illustrated in the following matrix:

| Output mode | Stress mode | | | | | |
|---|---|---|---|---|---|---|
| | 1 | 2 | 3 | 4 | 5 | 6 |
| | Compression axis | | | Shear axis | | |
| | X | Y | Z | X | Y | Z |
| 1. "X" | 0 | 0 | 0 | 0 | $d_{15}$ | $d_{16}=-2d_{22}$ |
| 2. "Y" | $d_{21}=-d_{22}$ | $d_{22}$ | 0 | $d_{24}=d_{15}$ | 0 | 0 |
| 3. "Z" | $d_{31}$ | $d_{32}=d_{31}$ | $d_{33}$ | 0 | 0 | 0 |

Where the various piezoelectric coefficients $d_{ij}$ have the values:

$$d_{15} = 6.8 \times 10^{-11} \text{ C/N}$$

$$d_{22} = 2.1 \times 10^{-11} \text{ C/N}$$

$$d_{31} = -0.1 \times 10^{-11} \text{ C/N}$$

$$d_{33} = 0.6 \times 10^{-11} \text{ C/N}$$

where C/N is the abbreviation for Coulombs per Newton. In the term $d_{ij}$, the first subscript refers to the electroded faces of the crystal, and the second subscript refers to the type and direction of stress. The numbers 1, 2, and 3 represent compressive stress in the X, Y, and Z directions respectively, and the numbers 4, 5, 6 represent shear moments about the X, Y, and Z axes respectively. For a crystal with electrodes on the X faces there is no response to X, Y, or Z compressive stresses or to shear stresses about the X axis. The existence of non-zero $d_{15}$ and $d_{16}$ piezoelectric coefficients represents the fact that signals are produced in response to shear moments about the Y and Z axes.

Referring to FIG. 3, a shear couple applied across the faces 52a and 52b, with the coupled forces applied in directions parallel to the Z axis, would generate a signal proportional to the $d_{15}$ piezoelectric coefficient. A shear couple applied across the faces 52a and 52b in a direction with the forces inclined to both the Z and Y axes would generate a signal on those faces dependent upon both $d_{15}$ and $d_{16}$ piezoelectric coefficients. The maximum sensitivity occurs for a shear stress at an angle, $\theta$ from the Z-axis given by the formula:

$$\theta = -\tan^{-1}(d_{16}/d_{15})$$

The effective piezoelectric coefficient at this angle is d, given by the formula $$d = \sqrt{d_{15}^2 + d_{16}^2}$$

For lithium niobate, $\theta$ is about 32° and $d$ is about $8 \times 10^{-11}$ C/N. For this reason, the crystal is mounted in the accelerometer with the Z-axis of the crystal inclined at an angle $\theta$ of about 32° relative to the predetermined axis of sensitivity A—A and with the Y axis about 122° from the sensitivity axis A—A. As will be noted from FIG. 3, the axis A—A lies in the second quadrant of the Y-Z plane.

In the embodiment of the invention illustrated in FIG. 1, two acceleration sensing units 16 are arranged symmetrically on opposite sides of the post 18. The two inner faces of the crystals in contact with the post 18 are connected electrically to the base 11, being in electrical communication therewith through the coatings 54a that are in contact with the post 18. The two outer faces, 52b of the piezoelectric elements 50 are in contact with the respective inertia members 70, and they are electrically connected together through a lightweight flexible electric connection which is insulated from the base 11 and which leads to a central contact 16 of a cable connector 62. The two crystals 50 therefore are electrically connected in parallel.

The particular arrangement shown in FIG. 1 is symmetrically balanced mechanically as well as electrically thereby avoiding distortion that might otherwise be produced by virtue of cantilever effects. Furthermore, cross-axis sensitivity is completely eliminated, insofar as accelerations in the directions in a plane perpendicular to the axis A—A are concerned. This transducer is also substantially free of pyroelectric effects. Thus, when the accelerometer of FIG. 1 is accelerated in a direction parallel to the axis A—A of maximum sensitivity, a charge is generated between the electrodes 54a and 54b perpendicular to the X axis that is proportional to the acceleration, and when the accelerometer is accelerated in some other direction, only the component of acceleration along the axis A—A is detected.

Another embodiment of the present invention is illustrated in FIG. 4. In the accelerometer shown in this figure only a single acceleration sensing unit 250 is employed. The piezoelectric unit 250 comprises two annular piezoelectric rings connected in parallel and electrically insulated from both the base 110 and the inertia member 270. More particularly, this acceleration sensing unit includes a series of piezoelectric and other annular elements stacked one upon another in the following order: an inner insulating washer 202, an inner gold electrode 204, a piezoelectric crystal 206, a central gold electrode 208, a piezoelectric crystal 210, an outer gold electrode 212, and an outer insulating washer 214. It is to be noted that this arrangement is symmetrical. Each of these elements has a hole in its center, enabling the stack of elements to be arranged in spaced-insulating arrangement with respect to the metal bolt 220 which extends through the center of the inertia member 270 and the post 118 that extends upwardly from the base 110.

The two outer electrodes 204 and 212 are connected together electrically by means of a gold bridging element 211 and one of them is provided with a downwardly extending lug 213. A lug 209 also projects from the central gold electrode 208. The two lugs are connected to two mutually insulated conductors (not shown) that lead to a cable 260. These crystals are of the same type previously described above, each being provided with mutually-insulated chromium, gold electrodes on the X faces thereof. Insulating washers composed of alumina and boron nitride have proved to be suitable.

Insulating washers 202 and 214 composed of boron nitride serve a dual purpose. Such washers are not only electrically non-conductive but are also characterized by a low coefficient of friction. It will be appreciated that the temperature coefficients of expansion of a crystal of the type employed in this invention are different in various directions parallel to the X faces. Thus, even though the temperature coefficient of expansion of Inconel is close to that of the temperature coefficient of expansion of lithium niobate, the match is imperfect and further, when the temperature changes, the lithium niobate discs tend to expand and contract in different amounts in different directions in the X plane. Stress produced by such differential expansion is minimized by employing washers 202 and 214 composed of boron nitride. Such washers would also be beneficial when using piezoelectric crystals composed of other material when the temperature coefficients of expansion vary with direction in planes that contact other isotropic mechanical elements.

Figure 5:
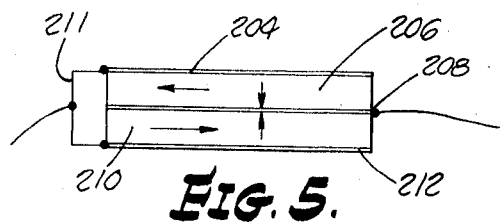
FIGS. 5 and 6 are elevational schematic views of alternative crystal arrangements employed in the invention.
Figure 6:
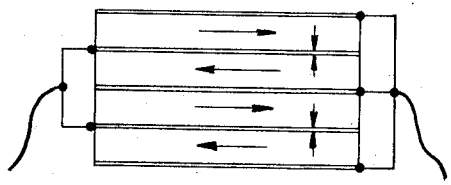

As indicated in FIG. 5, the two crystals 206 and 210 are mounted with their axes of maximum sensitivity in anti-parallel relation so that in the arrangement shown, the two voltages generated across the opposite faces of the two respective crystals are identically polarized with respect to the electrodes across their surfaces. That is, when the inner crystal 206 is sheared to produce a positive voltage between inner electrode 204 and central electrode 208, the outer crystal 210 is simultaneously sheared to produce a positive voltage between its outer electrode 212 and the central electrode 208. An arrangement employing four crystals in a stack is illustrated in FIG. 6.

Special precautions are taken to provide for long life of these accelerometers when they are used at high temperatures and low pressure, or in the presence of slightly reducing atmospheres. Such precautions are important because, as is well known, lithium niobate tends to be reduced, that is, lose its oxygen, when exposed to an atmosphere in which the partial pressure of oxygen is low.

The rate of reduction increases with the temperature. Such reduction results in removal of some of the oxygen from the crystal, thereby reducing the electrical resistivity of the crystal. Such reduction is retarded, if not entirely prevented, by providing a perforation 30 or 130 in the wall of the case 12 or 112, as the case may be, to provide a channel for ingress of oxygen from the outer atmosphere into the cavity within the case. Alternatively, the metal parts within the cavity may be pre-oxidized before the cavity is sealed, in order to minimize the tendency of oxygen to migrate from the lithium niobate crystal to these metal parts. A third alternative is to encase oxygen-releasing material, such as manganese dioxide, in a fixed (not loose) condition within the cavity. Providing communication through such perforation is the simplest so long as the atmosphere pressure is sufficient.

It is thus seen that this invention provides an accelerometer which may be employed for a prolonged period at high temperatures; and when employing lithium niobate in the form shown, the invention provides an accelerometer which is capable of use at high temperatures for prolonged periods; and in particular provides such an accelerometer of high sensitivity. Though the accelerometer of this invention is particularly suitable for use at high temperatures, because of the fact that the crystal material possesses high electromechanical efficiency (ratio of electrical power generated to the mechanical power producing the acceleration), it is also advantageous to employ the accelerometers at low temperatures.

The invention claimed is:

1. In an accelerometer of the shear type employing a force-measuring sensor in which an electrical signal is developed across two flat parallel faces of a piezoelectric element mounted with one of said faces secured to a force applying member that is adapted to move in a direction parallel to such faces in response to a force applied to said member by a component of acceleration in said direction and in which means are provided for conducting such electrical signals to a utilization device responsive thereto, said force applying member being attachable to an accelerating object, the improvement wherein said piezoelectric element comprises an X-cut lithium niobate crystal mounted with the X-axis of the crystal perpendicular to said direction, the Z-axis of said crystal being inclined about 32° with respect to said direction and the Y-axis of said crystal being inclined about 122° therefrom.

2. In an accelerometer as defined in claim 1, an inertia member attached to the other flat surface of said piezoelectric element.

3. In an accelerometer as defined in claim 2, including means defining an axis of acceleration and wherein one of said members has a base provided with a surface attachable to the surface of an accelerating object and in which the Z-axis of said crystal is inclined about 32° with respect to said direction and the Y-axis of said crystal is inclined about 122° therefrom.

4. In an accelerometer as defined in claim 3, provided with a perforated cover member cooperating with one of said two members for enclosing said crystal.

5. In an accelerometer as defined in claim 2 in which said crystal has a central hole therein, and a bolt extends through said crystal, and said two members are composed of metal, and an insulating washer is mounted between one of said members and said crystal.

6. In an accelerometer as defined in claim 2 in which said crystal has a central hole therein, and a bolt extends through said crystal and said two members, and wherein said bolt and said two members are composed of electrically conductive material, and insulating washers are mounted between said two members and said crystal, said washers being composed of insulating material having a low coefficient of friction.

7. In an accelerometer of the shear type employing force-measuring sensors in which electrical signals are developed across two flat parallel faces of each of at least two piezoelectric elements which are mounted on a force applying member that is adapted to move in a predetermined direction parallel to said faces in response to a force applied to said member and in which means are provided for conducting such electrical signals to a utilization device responsive thereto, said member being attachable to an accelerating object, the improvement wherein said piezoelectric element comprises an X-cut lithium niobate crystal mounted with the X-axis of the crystal perpendicular to said direction, the Z-axis of said crystals being inclined about 32° with respect to said predetermined direction and the Y-axis of said crystal being inclined about 122° to the normal to said surfaces.

8. An accelerometer as defined in claim 7 wherein said crystals have a central hole therein and a bolt extends through said holes in said crystals and said crystals are secured thereby between said two members.

9. An accelerometer defined in claim 8 wherein said two members are composed of metal, and further comprising a first insulating washer mounted between one of said members and one crystal and a second insulating washer mounted between the other member and the other crystal.

10. An accelerometer as defined in claim 6 further comprising a third member and a second crystal, said second crystal being mounted between said third member and said member having a base, said third member and said member having a base being adapted to move relatively to each other in a direction perpendicular to said base in response to an accelerating object secured to said member having a base.

11. An accelerometer as defined in claim 10 in which each of said crystals has a central hole therein and a bolt extends through said crystals, said members being composed of metal.

12. In an accelerometer as defined in claim 7, two inertia members attached respectively to the remaining of said flat surfaces of said piezoelectric elements.

* * * * *